United States Patent [19]
Pfisterer

[11] Patent Number: 5,778,646
[45] Date of Patent: Jul. 14, 1998

[54] GOLF GREEN GROOMING MACHINE

[75] Inventor: James W. Pfisterer, Arnold, Md.

[73] Assignee: Environmental Air Technology, LLC, Chester, Md.

[21] Appl. No.: 725,472

[22] Filed: Oct. 4, 1996

[51] Int. Cl.⁶ ................................................ A01D 75/00
[52] U.S. Cl. ........................... 56/16.4; 56/12.8; 15/340.4
[58] Field of Search ................... 56/16.4 R–12.8, 56/DIG. 8, DIG. 12, DIG. 23; 172/189, 612; 15/405, 340.3, 340.4

[56] References Cited

U.S. PATENT DOCUMENTS

| | | |
|---|---|---|
| 2,977,715 | 4/1961 | Lindsay . |
| 3,117,725 | 1/1964 | Palmer . |
| 3,284,831 | 11/1966 | Larsen ........................................ 15/405 |
| 3,341,125 | 9/1967 | Sweeney et al. . |
| 3,353,617 | 11/1967 | Hopkins . |
| 3,439,875 | 4/1969 | Randall et al. . |
| 3,512,714 | 5/1970 | Phelps et al. . |
| 3,561,558 | 2/1971 | Parkhouse . |
| 3,666,178 | 5/1972 | Crimmins et al. . |
| 3,804,332 | 4/1974 | Welch . |
| 3,908,784 | 9/1975 | Blurton et al. . |
| 4,274,589 | 6/1981 | Jones . |
| 5,272,858 | 12/1993 | Bonis ........................................ 56/12.8 |

FOREIGN PATENT DOCUMENTS 13338472  11/1973  United Kingdom .

*Primary Examiner*—Terry Lee Melius
*Attorney, Agent, or Firm*—Dennison, Meserole, Pollack & Scheiner

[57] ABSTRACT

A ground grooming machine including a mobile frame supporting a central elongate air flow assembly producing a downwardly directed pressurized flow of air within confining arcuate baffles. A brush assembly with two elongate floating brushes mount on the frame forward of the air flow assembly, and a single floating brush mounts on the frame in following relation to the air flow assembly.

10 Claims, 3 Drawing Sheets

GOLF GREEN GROOMING MACHINE

BACKGROUND OF THE INVENTION

In the grooming of golf courses, and in particular the greens thereof, several steps are normally involved. Initially, holes are provided in the green, usually by a conventional aerator which forms ⅝ inch holes four inches apart. A top dressing material, normally a mixture consisting principally of sand, and sometimes peat, fertilizer and the like, is then broadcast or otherwise distributed over the aerated surface. Finally, the top dressing is spread over the surface in an attempt to both introduce as much of the dressing as possible into the holes and provide a smooth playing surface. Conventionally, the final spreading and working of the dressing material into the surface has been done, with varying degrees of success, by utilizing a metal drag mat or screen, or by hand raking.

In addition to the labor intensive nature of the use of several metal drag mats, rakes, and the like, the mats in particular tend to stress and/or bruise the grass and, unless handled with extreme care, adversely affect the surface of the green. Additional problems encountered with the use of conventional equipment, include the difficulty in ensuring a positive distribution of the dressing material into the holes, the removal of excess material, particularly from the individual blades of grass, the necessity for manually cleaning the fringe areas, and the like.

SUMMARY OF THE INVENTION

The present invention is concerned with the final grooming step wherein the dressing material is distributed smoothly over the surface and uniformly introduced into the previously formed holes. As noted, this procedure has normally been performed by utilizing metal drag mats, rakes, and similar implements requiring constant and repeated surface contact.

The machine of the present invention utilizes a forced air system which provides air flow and a low pressure build-up to distribute the previously placed dressing material equally into the formed holes and smoothly over the surface without substantial ground contact or surface disruption and requiring only minimal labor. The device is preferably drawn by a tractor and is of a length, transversely positioned across the rear of the tractor, to cover an appreciable area of the ground surface for a maximum utilization of the distributing effect of the air flow and the pressure generated. Inasmuch as the major effect of the machine is achieved by this air flow and pressure, there is no stressing or bruising of the grass, the equipment and labor required is minimized, the top dressing material, even when rather heavy, is evenly distributed with no excess top dressing remaining on the blades of grass, and the actual amount of top dressing material required is reduced in light of the effective use of the dressing and the equal distribution thereof both into the holes and on the surface.

Certain additional or secondary benefits include a simplified means for delivering liquids to the surface by introducing such liquids into the air stream as well as for cleaning the fringe areas and making the greens immediately playable. Standing water distribution and displacement may also be achieved by the employment of this machine. The cutting of the grass is also facilitated in that the blades of grass are not encumbered by excess dressing material which, in the normal operation, can interfere with the smooth cutting of the grass and require frequent sharpening of the cutter blades.

The machine itself mounts on a mobile frame which, while possibly hand propelled, preferably connects to a tractor for a movement of the machine over the surface of the ground. The front and rear wheels are mounted for adjustment to vary the height of the frame and machine. Mounted on the frame are two forward brushes which are vertically adjustable and mounted to engage and follow the contours of the surface with varying degrees of pressure to both smooth the surface and initially engage, break up clumps of the dressing material and spread the dressing material.

The two forward brushes are followed by an elongate air chamber with a centrally positioned fan or blower inwardly drawing and downwardly directing a forced flow of air guided by an underlying deflector which distributed the air longitudinally along the chamber and laterally of the fan for discharge downward against the ground surface through a chamber bottom with multiple apertures therethrough. Intimately engaged with and depending from the chamber bottom are a pair of spaced annular baffles joined by intermediate arcuate baffles with the baffles extending substantially coextensive with the length of the chamber. The baffles, which comprise lower ground-sweeping flexible flaps, encourage a circular motion to the downwardly discharging air therein as the machine travels across the ground. This, plus the low pressure generated, has been found to encourage the spread of the top dressing material, effectively blow the dressing material into the holes, and remove excess material from the treatment area. The following edges of the baffles and a following brush, ensuring the desired distribution and packing in the ground holes and not on the blades of grass.

Both the forward and rear brushes are vertically adjustable whereby the ground engaging pressure can be varied. In addition, the brushes are mounted to float on the contours of the surface to follow possible irregularities therein and avoid any tendency to gouge or otherwise disrupt the surface.

While the machine is particularly intended as a ground grooming machine for golf greens and the like, the nature of the machine is such as to performed related functions such as the removal of standing water and/or light snow (with heated air) from a surface through the combined action of the air flow and the surface brushing.

Other details and features of the invention will become apparent from the more specific description of the invention following hereinafter.

BRIEF DESCRIPTION OF THE DRAWINGS

FIG. 5 is a bottom plan view, on line 5—5 of FIG. 2, of the fan and fan housing.

DESCRIPTION OF PREFERRED EMBODIMENT

Referring now more specifically to the drawings, the machine 10 is particularly adapted for towing by an appropriate vehicle 12, such as a tractor, and as such includes a forwardly directed hitch assembly 14 pivotally engaged with the machine support frame 16.

Figure 4:
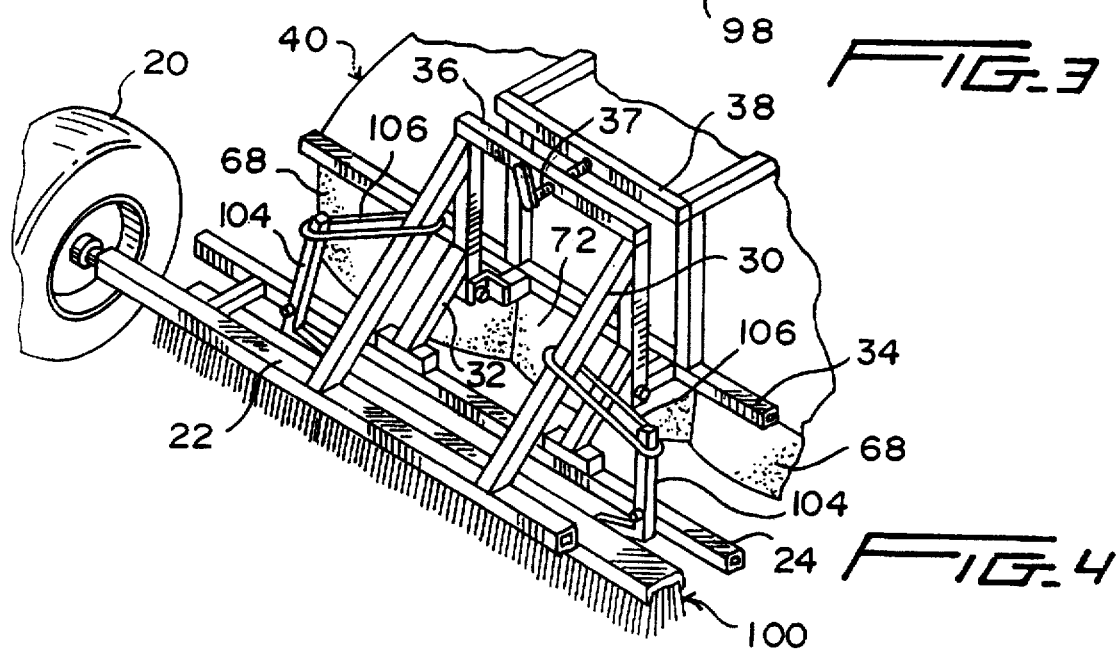
FIG. 4 is a partial perspective view of the rear portion of the equipment illustrating the adjustable mounting of rear wheels and the rear brush.

The support frame 16 is elongate transversely of the direction or path of travel of the machine, and is a mobile frame supported by a vertically adjustable single forward nose wheel 18 and a pair of transversely spaced rear support wheels 20. The rear wheels 20, noting FIGS. 2 and 4 in particular, rotatably mount to the opposed ends of an elongate bar 22 extending therebetween and defining an axle. A parallel bar 24 is spaced forwardly therefrom and rigid therewith by cross braces 26. The bars 22 and 24 are joined to a pair of laterally spaced uprights 28 by a pair of angle braces 30 and 32 rigid respectively with the bars 22 and 24. The uprights 28 have the lower ends thereof pivotally engaged with a main frame member 34. The upper ends of the uprights 28 are rigidly joined by a transverse bar 36 which threadedly receives a handle adjusting rod 37. The rod 37, through engagement with another main frame member 38 above the frame member 34, effects a corresponding upward and downward pivotal adjustment of the wheels 22 in an obvious manner. While not limited to the specific manner of wheel adjustment, this particular arrangement has been found to be both efficient and practical.

The major operating component of the machine 10 is an air flow generating and distribution assembly. This assembly includes an elongate hood 40 which basically defines the length of the machine transversely of the path of travel. The hood includes an upper wall 42 of a constant transverse arc along the full length thereof which defines a concave downwardly directed inner face 44. The hood also includes a bottom or bottom wall 46 with a full length central upwardly arced portion 48 and opposed linear flat side portions 50. The bottom wall 46, with the arced upper wall 42 provides a constant width transversely arcing chamber, best noted in FIG. 2, with the upper wall 42 and bottom wall 46 having the opposed ends thereof closed by segment-shaped end walls 52. The formed hood 40 is mounted to the frame, between forward and rear beams, note as an example rear beam 34 and a similar forward beam 54, in any appropriate manner as by welding, bolting, or the like utilizing brackets (not shown) as required. A forced downward flow of air is introduced centrally into the hood chamber by a fan assembly 56 supported by a central portion of the frame 16 which is in an elevated overlying position relative to the central portion of the hood 40. The fan assembly 56, in addition to a power source or motor, includes a depending multi-bladed fan 58 received within an upwardly directed fan housing 60 mounted to or integrally formed with the upper arcuate wall 42 of the hood 40. The housing providing appropriate clearance for the fan blades and opens upwardly in a manner as to ensure a proper supply of air, and downwardly so as to provide for an unencumbered free downward forcing of the air for pressurization within the hood chamber and ultimate discharge through the bottom wall 46 as shall be explained presently. While one manner of mounting the fan assembly has been illustrated, the actual arrangement of the support beams and the like of the support frame 16 can vary as required in accordance with the specific equipment utilized.

The bottom wall 46 of the hood 40 is provided with series of air discharge apertures or openings 62. The arrangement of the apertures and the downward distribution of air therethrough is related to and guided by arcuate baffles mounted to and depending from the under surface of the bottom wall 46. These baffles include two circular units 64 longitudinally spaced from each other and positioned immediately inward of the opposed end walls 52. These units are of a diameter slightly less than the forward to rear width of the bottom wall 46 and hence hood 40, and are positioned with a central space therebetween vertically aligned with the fan 58. The two circular baffle units 64 are centrally joined by a pair of forward and rear baffle units 66, each defining an arc on a radius equal to that of the full circle units 64, providing in effect three overlapping circular assemblies defining a series of generally circular areas.

Each of the end baffle units 64 is defined by a depending ground-engaging resiliently flexible skirt or flap 68 which has the upper end fixedly secured to the hood bottom wall 46 in any appropriate manner, as by bolting to a depending annular flange 70 rigid with the undersurface of the bottom 46. These resilient flaps 68 confine the air flow discharging through the hood openings 62 to provide a sufficient air movement and build-up of air pressure to effectively agitate and downwardly force the dressing material into the ground apertures and smoothly over the ground surface. The circular nature of the baffle-forming flaps also encourage a continuing circular flow of the air as the machine is forwardly drawn along the ground.

Figure 3:
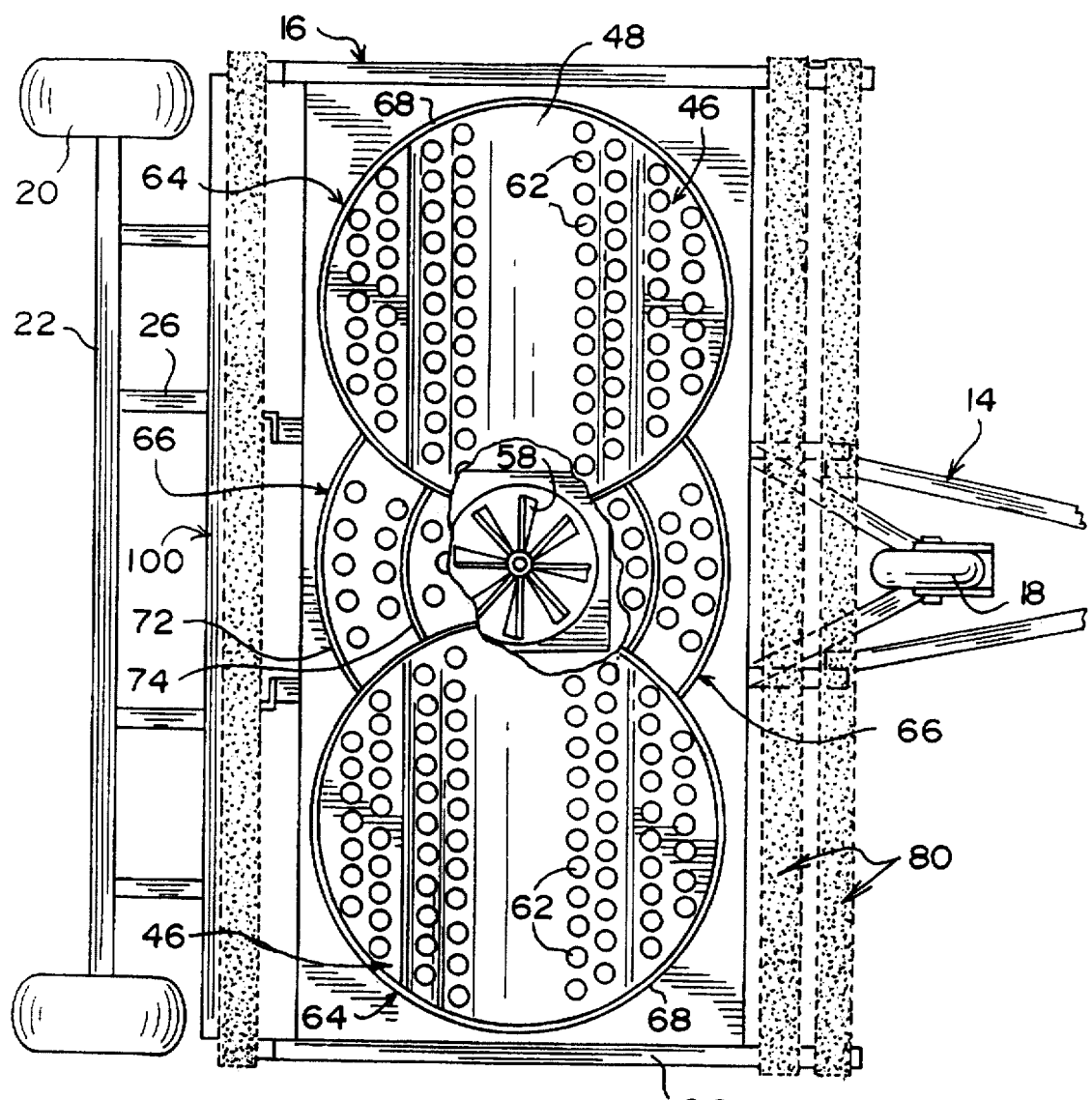
FIG. 3 is a bottom plan view of the machine with portions broken away for purposes of illustration.

Noting FIG. 3, the central baffle units 66 utilize similar arcuate skirts or flaps 72 which provide for a similar flow pattern between the full circle units 64. As desired, a reduced height baffle 76 can parallel the central unit baffles 72 in inwardly spaced relation thereto to encourage an initial longitudinal distribution of the incoming air along the length of the hood prior to the lateral distribution thereof encouraged by the central upwardly arcing air deflector or distributor portion 48 of the bottom wall 46.

Figure 2:
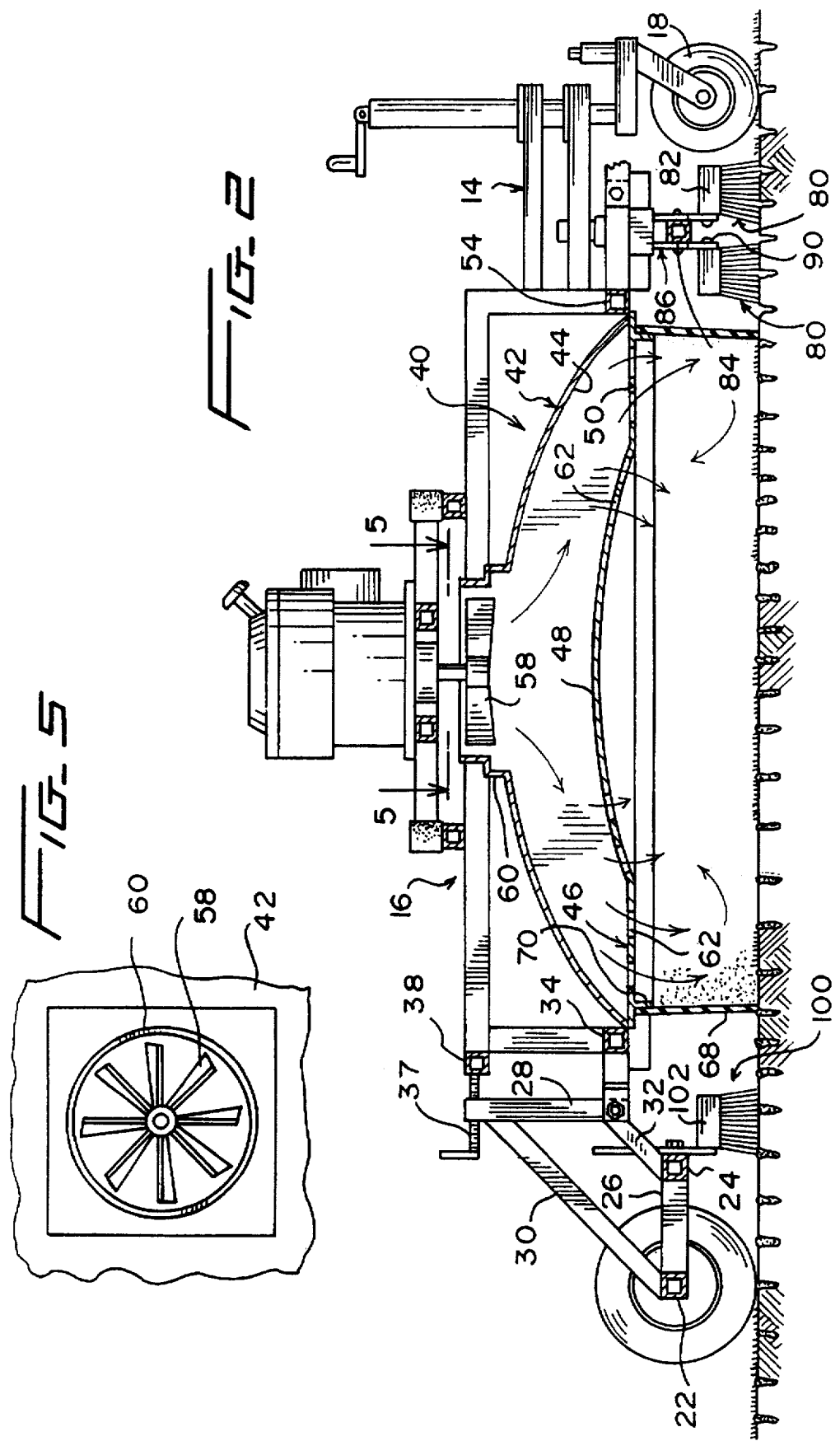
FIG. 2 is an enlarged transverse cross-sectional view through the machine illustrating the general air flow and the relationship of the equipment to the surface being dressed.

With reference to FIGS. 2 and 3, it will be seen that the distribution of the apertures 62 is, in the baffle units 64, preferably longitudinal with rows commencing within and toward the outer edges of the central deflector 48 and extending into the planar or flat portions of the bottom wall 46 within the confines of the baffle skirts 68. The central portion of the deflector 48 is preferably without perforations to encourage the desired distribution of air throughout the full extent of the hood prior to its pressurized discharge toward the ground surface.

In the central baffle units 66, the distribution of the apertures tends to follow the arcuate curvatures of these units, this being considered to provide the best air distribution and the most effective settling of the dressing material.

The relatively large size of the holes 62, as shown in FIG. 3, provides for a low pressure discharge which effectively blows the dressing material into the ground holes.

Immediately forward of the hood and other components of the air flow assembly, the frame 16 mounts a pair of elongate brushes 80. The brushes 80 are positioned in closely spaced parallel relation to each other and constitute the first portion of the machine to engage the previously placed surface dressing for an initial breaking up of any clumps therein, and a smoothing and even distribution thereof. Each brush includes a rigid back bar 82 which is joined to a single parallel adjustment bar 84 centrally therebetween and vertically thereabove by a pair of longitudinally spaced L-shaped levers 86. Each lever 86, at the angle or apex 88 thereof, is pivoted to the adjustment bar 84, and at the lower end of a first leg thereof, as at 90, is pivoted to the corresponding brush back bar 82. The second leg of each lever 86 extends vertically above the upper adjustment bar 84. The brushes, thus mounted, are free to float up and down in response to the contours of the ground surface over which the brushes traverse.

Figure 1:
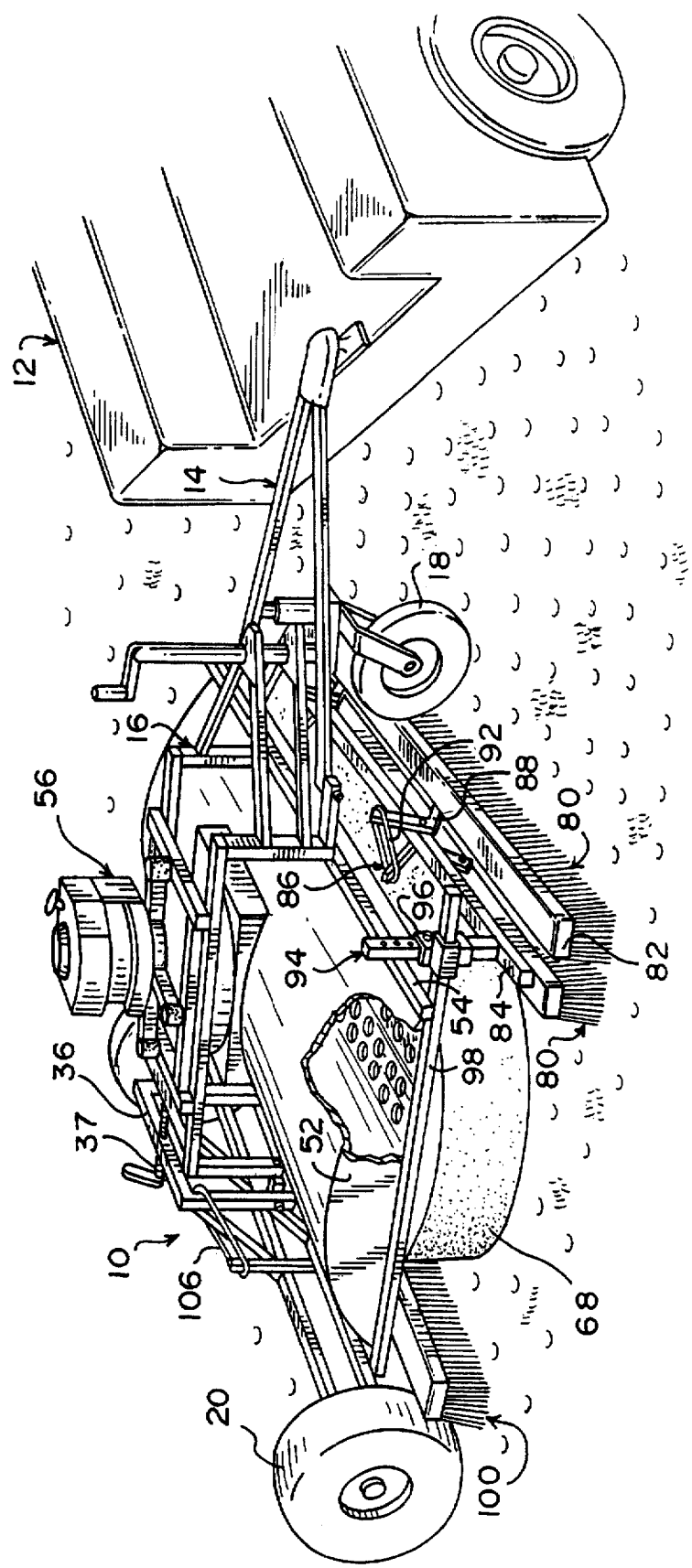
FIG. 1 is a perspective view of the machine of the invention affixed to a towing vehicle and with a portion broken away for purposes of illustration.

Noting FIG. 1 in particular, the levers 86 of the two brushes 80 are arranged in laterally aligned pairs with the levers rotated 180° from each other whereby the upper legs thereof extend in opposite directions. In order to provide the desired floating action to the brushes 80, a resilient member 92, for example an adjustable bungee cord, will engage between the two outer legs of each pair of levers 86, thus biasing these upper legs toward each other and initially positioning the height of the brushes while allowing for an upward floating action of the individual brushes accommodated by the resilient nature of the elastomeric member 92. It will also be appreciated that separate elastomeric members, similar to 92, can be applied between the outer leg of each lever 86 and the brush support bar 84 to either side of the leg depending upon the direction of bias desired. The effective length and/or strength of the elastomeric member 92 can be varied in accord with the ground-engaging pressure desired.

Again referring to FIG. 1, the brush support bar 84 is itself mounted for vertical adjustment relative to the wheel supported frame by means of a pair of posts 94 fixed to the bar 84 toward the opposite ends thereof and extending vertically through a sleeve 96 slidably mounted on a front to rear frame beam 98 thereabove. An aperture in the sleeve 96 is selectively alignable with any one of a series of vertically spaced apertures in the post 94 for the reception of an appropriate retaining pin therethrough.

The machine 10 of the invention also includes a rear brush 100 similarly having a back bar 102 supported by a pair of L-shaped levers 104 with the lower legs thereof pivotally engaged with the back bar 102 and a central or apex portion thereof pivotally engaged with the overlying frame bar 24 previously described as a portion of the support assembly for the rear wheel assembly. Appropriate elastomeric members 106 engage between the outer leg of each of the levers 104 and the adjacent bracing bars 30, also a part of the wheel support assembly. This relationship will be best noted in the detailed perspective view of FIG. 4. So mounted, it will be appreciated that through the adjustment screw 36 which adjusts the height of the rear wheel assembly, a corresponding vertical adjustment of the rear brush 100 will also be achieved. This adjustment, in addition to the floating action of the rear brush 100 in light of the levers 104 and elastomeric numbers 106, ensures the desired ground engagement and contour accommodation to provide the grooming effect sought, basically a final packing of the dressing material into the ground holes.

The disclosed embodiment while illustrating the features of the invention, is not to be considered a limitation on the scope of the invention. Rather, the invention is considered to encompass all embodiments falling within the scope of the claims following hereinafter. With regard thereto, it will be appreciated that additional embodiments can include obvious variations in, as an example, the basic frame, the height adjustment means for the wheels, and the like.

I claim:

1. A ground grooming machine comprising a mobile support structure movable along a path of travel, an air flow generating assembly mounted on said support structure, said assembly including fan means for generating a downward flow of air, a chamber supported by said support structure for receiving, confining and directing said flow of air, said chamber having a bottom with downwardly directed discharge apertures therein for the downwardly directed discharge of the air flow therethrough, said support structure supporting said chamber vertically above a ground surface, and flexible baffle means depending from and surrounding said chamber bottom for engagement with the ground surface, said baffle means extending around said openings in said chamber bottom and confining said air flow to the ground surface aligned below said chamber, a first brush assembly positioned forward of said air flow generating assembly along the path of travel, and a second brush assembly positioned rearward of said air flow generating assembly along the path of travel, and means for mounting said brush assemblies on said support structure for automatic vertical adjustment in response to the contours of an underlying ground surface over which the machine traverses.

2. The machine of claim 1 wherein said chamber is longitudinally elongate transversely of the path of travel of the mobile support structure, and is laterally arcuate along the full length thereof, said chamber bottom being generally planar with a central, longitudinally extending, upwardly arcing air deflector, said air deflector, for a major central portion thereof, being devoid of apertures, said bottom apertures being defined through said central deflector laterally to each side of the central portion thereof and through the remainder of said chamber bottom laterally of said central deflector.

3. The machine of claim 2 wherein said baffle comprise arcuate flexible ground engaging skirts defining a series of generally circular areas below said chamber bottom centrally along the length of said chamber and between said chamber bottom and an underlying ground surface.

4. The machine of claim 3 wherein said air flow generating assembly is positioned on said support structure centrally over and in direct communication with said chamber.

5. The machine of claim 4 wherein said forward brush assembly comprises two closely spaced parallel brushes substantially coextensive in length with said chamber, said rearward brush assembly comprising a single elongate brush substantially coextensive with said chamber.

6. The machine of claim 5 wherein said mobile support structure includes ground-engaging wheels, and means mounting said wheels for vertical adjustment for a corresponding vertical adjustment of said support structure.

7. A ground surface grooming machine comprising a mobile support structure movable along a path of travel, an elongate hood mounted on said structure transversely of the path of travel, said hood including an upper wall with a concave downwardly directed inner face, and a bottom wall, said walls defining an elongate hood chamber of arcuate cross section along at least a major portion of the length of said hood, air circulating fan mounted vertically over said upper wall and centrally communicating with said chamber, said bottom wall including an air flow positioned deflector longitudinally and centrally therealong, said deflector being transversely arcuate and generally conforming to the concave inner face of said upper wall in spaced relation therebelow, said bottom wall further including planar portions to each side of said deflector extending from said deflector to said upper wall, a plurality of air flow discharge openings within said bottom wall laterally to each side of said central deflector wherein air flow directed into said chamber by said air circulating fan is laterally deflected by said deflector and downwardly discharged through said bottom wall openings, and ground-engaging skirts fixed to said hood and depending therefrom around said bottom wall openings for confining and downwardly directing of a discharged air flow.

8. The machine of claim 7 wherein selected ones of said skirts are substantially circular to define circular air-confining areas wherein circulation of air flow is encouraged.

9. The machine of claim 8 wherein said bottom openings extend longitudinally along a minor portion of said deflector laterally of a central longitudinally extending major portion of said deflector.

10. The machine of claim 9 including forward and rear brush assemblies mounted to and depending from said mobile support structure forwardly and rearwardly of said elongate hood relative to the path of travel, said brush assemblies being elongate and substantially coextensive with and parallel to said hood.

* * * * *